US012328587B2

(12) United States Patent
Greve et al.

(10) Patent No.: US 12,328,587 B2
(45) Date of Patent: Jun. 10, 2025

(54) METHOD AND A SYSTEM FOR SECURELY SHARING DATASETS VIA GLYPHS

(71) Applicant: Vereign AG, Zug (CH)

(72) Inventors: Georg Greve, Küsnacht (CH); Gospodin Bodurov, Burgas (BG)

(73) Assignee: Vereign AG, Zug (CH)

( * ) Notice: Subject to any disclaimer, the term of this patent is extended or adjusted under 35 U.S.C. 154(b) by 226 days.

(21) Appl. No.: 18/265,206

(22) PCT Filed: Dec. 3, 2021

(86) PCT No.: PCT/IB2021/061318
§ 371 (c)(1),
(2) Date: Jun. 2, 2023

(87) PCT Pub. No.: WO2022/118281
PCT Pub. Date: Jun. 9, 2022

(65) Prior Publication Data
US 2024/0107318 A1     Mar. 28, 2024

(30) Foreign Application Priority Data

Dec. 4, 2020 (CH) ................................. CH01543/20

(51) Int. Cl.
*H04W 12/77* (2021.01)
*G06F 21/60* (2013.01)
(Continued)

(52) U.S. Cl.
CPC .......... *H04W 12/77* (2021.01); *G06F 21/602* (2013.01); *H04L 9/0894* (2013.01); *H04L 9/3242* (2013.01)

(58) Field of Classification Search
CPC .... H04W 12/77; G06F 21/602; H04L 9/0894; H04L 9/3242
USPC ........................................................ 713/155
See application file for complete search history.

(56) References Cited

U.S. PATENT DOCUMENTS 6,138,237 A * 10/2000 Ruben ..................... G06F 21/10
726/21
7,991,153 B1 * 8/2011 Rao ........................ G09C 1/00
713/176

(Continued)

FOREIGN PATENT DOCUMENTS

EP        2509275 A1     10/2012

OTHER PUBLICATIONS

International Search Report for PCT/IB2021/061318, dated Feb. 28, 2022, 4 pgs.

*Primary Examiner* — Samson B Lemma
(74) *Attorney, Agent, or Firm* — Blank Rome LLP

(57) ABSTRACT

The present disclosure concerns a method for securely sharing a dataset via a glyph comprising: —splitting said dataset into at least two data subsets using a splitting module, —generating a payload for the glyph using a first data subset from the at least two data subsets, —storing all the at least two data subsets but the first data subset in a key value database with a hash value obtained from the payload as storage key, —generating the glyph representing the payload and sharing the glyph via an output medium. The present disclosure also concerns a method for interpreting a glyph, comprising via an image capture device, scanning said glyph to retrieve a payload, deriving a first data subset from said payload, retrieving at least one data subset in a key-value database using a hash of the payload as storage key, assembling said data subsets into said dataset, deserializing said dataset. The present disclosure also concerns a system for securely sharing a dataset via a glyph comprising: —a processor an image capture device; —a storage for storing a key value database and a computer program arranged for casing said processor to carry out the methods of any of the previous claims when said program is executed. Finally, the present disclosure concerns a data (Continued)

storing medium comprising a computer program arranged for causing a data processing system to carry out the described methods when said computer program, is executed.

18 Claims, 5 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 10,176,353 B2 * | 1/2019 | Chamandy | G06K 7/10554 |
| 10,404,462 B2 * | 9/2019 | Carter | G09C 5/00 |
| 11,049,349 B2 * | 6/2021 | Onischuk | G07C 13/00 |
| 2005/0010776 A1 * | 1/2005 | Kenen | G07D 7/004 |
| | | | 713/176 |
| 2007/0170250 A1 | 7/2007 | Bystrom et al. | |
| 2015/0356306 A1 * | 12/2015 | Carter | G06F 21/64 |
| | | | 380/246 |
| 2015/0358164 A1 * | 12/2015 | Carter | G09C 5/00 |
| | | | 713/179 |
| 2016/0117448 A1 | 4/2016 | Van De Craen et al. | |
| 2017/0134167 A1 * | 5/2017 | Carter | G09C 5/00 |
| 2019/0182042 A1 * | 6/2019 | Ebrahimi | H04L 9/3234 |
| 2022/0230563 A1 * | 7/2022 | Forte | H04L 9/3236 |

\* cited by examiner

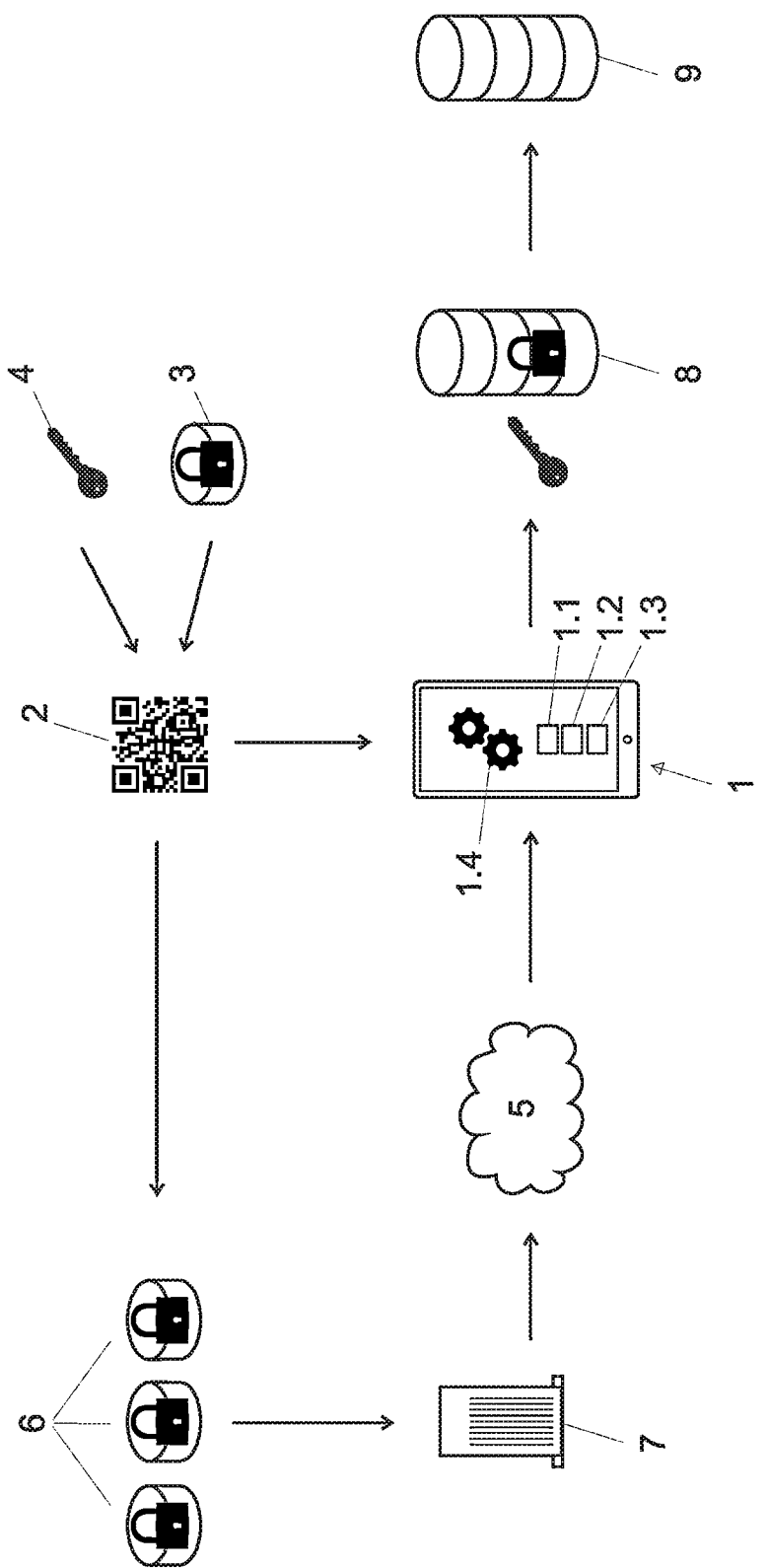

METHOD AND A SYSTEM FOR SECURELY SHARING DATASETS VIA GLYPHS

RELATED APPLICATION

This application is a national phase of PCT/IB2021/061318, filed Dec. 3, 2021, which claims priority from Swiss patent application No CH20200001543, filed Dec. 4, 2020, the contents whereof are entirely incorporated.

FIELD OF INVENTION

The present disclosure concerns a method and a system for securely sharing datasets via glyphs.

BACKGROUND OF THE INVENTION

Data sharing via glyphs such as barcodes or QR-codes refers to the standard protocol of giving a user an access to some data after he has read a glyph with an appropriate image capture device such as a smartphone with a camera. The data can be contained in the glyph itself, which holds for small datasets since only a limited amount of data can be encoded in such glyphs, but the glyph can also be used, for example, as a way of accessing a server storing data of arbitrary size by providing a URL to the user.

The security of such data sharing systems is obviously of utmost importance as the data can contain for example medical or bank information about a patient or a customer. In existing such systems, the security of the data is ensured by an encryption of the datasets themselves and/or by a control of the user identity by means of a password, or more generally by a multi-factor authentication, independently of the glyph. In other words, a sufficiently skilled informatic pirate could access the data by decrypting the data after having obtained say the password of a user, without having knowledge of the glyph.

US 2016/117448 A1 describes a system for managing medical data in which a patient can request a doctor to share medical data by providing a QR-code that the doctor can scan with an appropriate device such as a smartphone. In this case, the QR-code only contains the request from the patient to the doctor and no confidential information. The authentication of the user can be required by the module providing the medical data. The security of the medical data accessible by this procedure entirely relies on the authentication of the user and the encryption of the data.

US 2015/358164 A1 discloses a method and a system for validating and verifying documents by first encrypting a dataset with a private key, and generating a glyph representing the encrypted dataset. This glyph is then overlayed on a digital image of a document related to the dataset. A user may then scan the glyph with a mobile device to recover the encrypted dataset and decrypt it. The size of the dataset is therefore limited by the maximum payload of the glyph.

EP 2 509 275 A1 discloses an authentication method based on the use of a password, a private key QR-code and a matching public key QR-code, both QR-codes being generated from URLs and PKIs private/public keys.

US 2007/170250 A1 discloses a method for copy protection of digital documents. The method is based on the generation of a glyph based on an encrypted ID of the digital document (the ID is constructed from copy protection data such as a password or a copy count that are related to the digital document). The glyph is then incorporated to the digital document and a thumb print of the document content and adds it to the document. Finally, a watermark is added to the digital document and a hardcopy is printed.

BRIEF SUMMARY OF THE INVENTION

It is an aim of the present disclosure to present a method for securely sharing datasets via a glyph.

Another aim is to present a method for interpreting a glyph.

A third aim of the present disclosure is to provide a system for securely sharing a dataset via a glyph.

According to one aspect, those aims can be achieved with a method for securely sharing a dataset via a glyph comprising:
 splitting said dataset into at least two data subsets using a splitting module,
 generating a payload for the glyph using a first data subset from the at least two data subsets,
 storing all the at least two data subsets but the first data subset in a key value database with a hash value obtained from the payload as storage key,
 allowing storage of the second and subsequent data sets in a public repository without reducing the integrity and security of the encoded data,
 generating the glyph representing the payload and
 sharing the glyph via an output medium.

The method may comprise a preliminary step of encrypting a dataset into an encrypted dataset using an encryption parameter.

The encryption parameter may comprise a symmetric encryption key.

The encryption parameter may comprise a symmetric encryption key and an initialization vector.

The encryption parameter may be encrypted using a second encryption parameter of comparatively small size.

The payload for the glyph may be generated using said first dataset and said encryption parameter.

The payload may be generated with said first data subset and said second encryption parameter.

The method may comprise a step of storing said encrypted encryption parameter in said key-value database with a hash value obtained from the payload as storage key.

The splitting of the dataset may be operated using a cryptographic splitting module.

The output medium may consist of a computer or a mobile screen device.

According to another aspect, those aims can be achieved by a method for interpreting a glyph, comprising
 via an image capture device, scanning said glyph to retrieve a payload,
 deriving a first data subset from said payload,
 retrieving at least one data subset in a key-value database using a hash of the payload as storage key,
 assembling said data subsets into said dataset.

The above method may comprise a final step of deserializing said dataset after the assembling step.

The dataset may be an encrypted dataset. In that case, the method may include a decryption step comprising:
 deriving an encryption parameter from said payload,
 decrypting the encrypted dataset using the encryption parameter to obtain a decrypted dataset.

The method may include a decryption step comprising:
 deriving a second encryption parameter from said payload,
 retrieving an encrypted encryption parameter in a key-value database using a hash of the payload, as storage key, decrypting said encrypted encryption parameter using said second encryption parameter to obtain an encryption parameter, decrypting the encrypted dataset using the encryption parameter to obtain a decrypted dataset.

The data subsets of the second method may have been obtained from said dataset by applying a cryptographic splitting algorithm.

The method may include a step of authenticating with a multi-factor authentication to access said at least one data subset in said key-value database.

The glyph of both methods may consist of a barcode or matrix code.

The previously described methods may comprise a step of revoking said glyph by deleting said data subsets from said key-value database.

The previously described methods may comprise a step of revoking said glyph by deleting said encryption parameter and/or said second encryption parameter.

According to another aspect, the aforementioned aims can be achieved with a system for securely sharing a dataset via a glyph comprising:
- a processor,
- an image capture device,
- a storage for storing a key value database and a computer program arranged for casing said processor to carry out the methods of any of the previous claims when said program is executed.

According to another aspect, the aforementioned aims can be achieved with a data storing medium comprising a computer program arranged for causing a data processing system to carry out any of the methods described above when said computer program is executed.

BRIEF DESCRIPTION OF THE DRAWINGS

The invention will be better understood with the aid of the description of an embodiment given by way of example and illustrated by the figures, in which:

FIG. 5 illustrates schematically a system for carrying out a method according to the invention.

DETAILED DESCRIPTION OF THE DISCLOSURE

Figure 1:
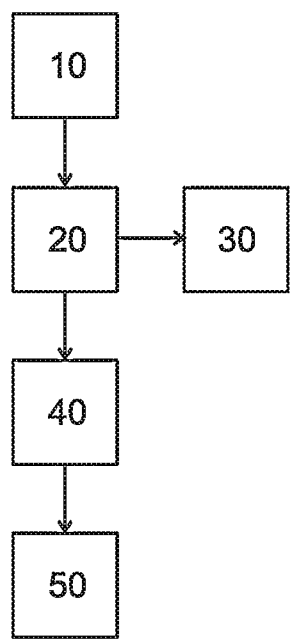
FIG. 1 illustrates a flowchart of an example of method for generating and sharing a dataset using a glyph according to the invention.

As illustrated with the Flowchart of FIG. 1, an embodiment of a method for generating and sharing a dataset 9 using a glyph 2 can comprise the following main steps:
10. Splitting a dataset 9 into at least two data subsets 3, 6.
20. Generating a payload using the first data subset 3.
30. Storing all data subsets but the first data subset 6 in a key-value database with a hash value of the payload as storage key.
40. Generating a glyph 2 encoding the payload.
50. Sharing the glyph 2 via an output medium.

Dataset

In the context of this disclosure, a dataset 9 may comprise data of any kind and of any size. In particular, the dataset 9 can include medical data, electronic record data, tracking data, email data, etc.

In a particular embodiment in which the structure of the dataset 9 is particularly complex, a preliminary step of serializing 60 the dataset 9 into a byte stream can be applied.

Glyph

In the present disclosure, a glyph 2 is meant to be a symbol which is used to convey information to other devices when the glyph 2 is scanned. Examples of glyphs comprise one-dimensional barcodes, two-dimensional codes such as quick-response codes (QR codes) or data matrices.

A glyph 2 therefore comprises a symbol and a payload, i.e. an information that is encoded in the symbol. The payload represents a relatively small amount of information with respect to the entire dataset 9 that is to be shared as the storage capacity of glyphs is fairly limited. In the case of QR-codes, the storage capacity is at most 7089 numeric characters.

In a particular embodiment illustrated in FIG. 5, the glyph 2 is a QR-code and the payload is a URL deploying a web application used to visualize and process the dataset 9.

This means the payload can also be shared as a URL where glyphs may be inconvenient, for example via social media or other (primarily) text-based channels, including email.

Encryption of Dataset

In a particular embodiment the method described above comprises an encryption step 70, 80 before the splitting 10 of the dataset 9. During this encryption step, the dataset 9 is encrypted using an encryption parameter which can comprise an encryption key, a combination of an encryption key and an initialisation vector or any other suitable encryption protocol.

Figure 2:
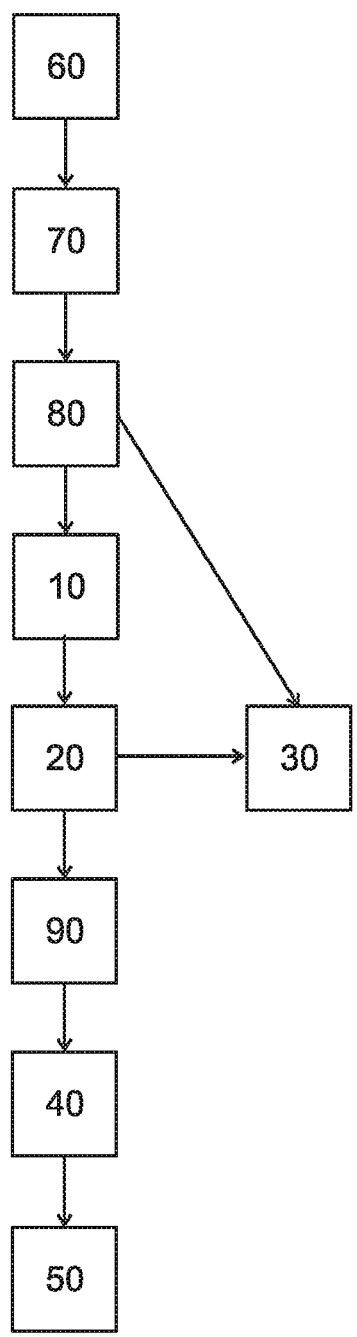
FIG. 2 illustrates a flowchart of another example of method for generating and sharing a dataset using a glyph according to the invention.

An embodiment of this method comprising an encryption step is illustrated with the Flowchart of FIG. 2. The method comprises the following:
60. Serializing the dataset.
70. Encrypting the dataset into an encrypted dataset using an encryption parameter.
80. Encrypting the encryption parameter using a comparatively small second encryption parameter.
10. Splitting the dataset into at least two data subsets.
20. Generating a payload using the first data subset and the second encryption parameter.
30. Storing all data subsets but the first data subset and the encrypted encryption parameter in a key-value database with a hash value of the payload P as storage key.
90. Encrypting the payload with a symmetric encryption key.
40. Generating a glyph encoding the encrypted payload.
50. Sharing the glyph via an output medium.

In an alternative embodiment the order of the steps is such that the splitting step and the payload generation step are applied before the encryption. In this case, the method comprises the following steps:
60. Serializing the dataset.
10. Splitting the dataset into at least two data subsets.
20. Generating a payload using the first data subset and the second encryption parameter.
70. Encrypting the dataset into an encrypted dataset using an encryption parameter.
80. Encrypting the encryption parameter using a comparatively small second encryption parameter.

30. Storing all data subsets but the first data subset and the encrypted encryption parameter in a key-value database with a hash value of the payload P as storage key.
90. Encrypting the payload with a symmetric encryption key.
40. Generating a glyph encoding the encrypted payload.
50. Sharing the glyph via an output medium.

The order of the steps of storing the data subsets in a key-value database and of encrypting the payload may also be interchanged so that it is a hash-value of the encrypted payload that is used as storage key for the key-value database.

The encryption parameter can be a symmetric encryption key 4 such as an AES-128, AES-192 or AES-256 encryption key. This symmetric key 4 can be provided by a suitable service or app used to treat the dataset 9, or it can be provided by a web service which is also available at the time of decryption.

If the encryption protocol involves a comparatively larger encryption parameter which is too large to be encoded in the glyph 2, an additional encryption step can be operated to produce an encrypted encryption parameter. The large encryption parameter is encrypted using a comparatively small encryption parameter which will be encoded in the glyph 2 while the encrypted encryption parameter is stored in a key-value database as explained thereafter. This solution allows the use of larger encryption keys or encryption parameters which leads to an increased level of security of the method.

In a particular embodiment, the dataset 9 is encrypted into an encrypted dataset 8 using an encryption parameter of comparatively large size, for example an AES-GCM encryption protocol involving a symmetric encryption key and an initialisation vector that are too large to be encoded in a glyph 2 such as a QR-code. In this case, the encryption parameter may be itself encrypted using a symmetric encryption key such as for example a symmetric AES key of 256 bits. The resulting encrypted encryption parameter is stored in a key-value database with the other data subsets 6 as explained thereafter, while the key is sufficiently small to be encoded in a glyph 2. The AES-GCM encryption protocol mentioned above is only one example and any other encryption protocol needing large encryption data may be used in the present invention.

In another embodiment in which the size of the dataset 9 is comparatively small or of type or structure that can be guessable, the dataset 9 can be salted or randomly padded to arbitrarily increase its size before the aforementioned encryption step.

In another particular embodiment, the dataset 9 comprises email information such as for example
 the name and email address of the sender,
 the subject of the message,
 the names and email addresses of all recipients,
 the date of the message,
 the names, sizes and signatures of the attachments.

The dataset is encrypted as explained above using an encryption parameter which is itself encrypted by a hardware security module service (HSM service) using a public symmetric encryption key. The encrypted dataset is then split so that a first data subset, called the head and a second data subset, called the tail. A payload is then generated using the head and the public symmetric encryption key and optionally this payload is also itself encrypted with a public symmetric key. The tail is stored in a key-value database with a hash value of the payload as storage key. A QR-code encoding the payload is then generated and shared via a computer or smartphone screen. This embodiment of the method can be used to provide a secure signature to an email by integrating the QR-code into the email.

Dataset Splitting

The method described above comprises a first step of splitting 10 a dataset 9 into at least two data subsets 3, 6 using a splitting module. The dataset 9 can be split in an arbitrary number of data subsets.

In a particular embodiment, the dataset 9 is split into two data subsets, the first data subset consisting of the first half of the number of bytes of the dataset 9, and the second data subset consisting of the rest of the bytes of the dataset 9. Any other splitting by slicing the dataset 9 at regular intervals can be considered.

For security purposes, it is often desirable to make the reassembling of the data subsets difficult for anyone who should not have access to the data. Therefore, the splitting can be made using a cryptographic splitting module. In a particular embodiment, a dataset 9 is first divided into an arbitrary number of portions that are then reassembled by an algorithm that is kept secret, into at least two data subsets 3, 6. Without knowing the algorithm, no one is able to reassemble the data subsets 3, 6 into the original dataset 9.

Generating Payload

According to the method described above, a payload for the glyph 2 is then generated using the first data subset 3 obtained during the data splitting step 10.

In a particular embodiment in which the dataset 9 has been encrypted with an encryption parameter which is an encryption key 4 of a comparatively small size allowing its encoding in the glyph 2, the payload is generated using both the first encrypted data subset 3 and the encryption key 4.

In another particular embodiment in which the encrypted dataset 8 has been encrypted using an encryption protocol that needs a comparatively large encryption parameter, the encryption parameter itself can be encrypted into an encrypted encryption parameter using an encryption key. In this case, the payload is generated using the first encrypted data subset 3 and the encryption key.

In an embodiment, the payload can be further encrypted into an encrypted payload using a public symmetric encryption key. This public encryption key is generated by the service or the application that will process the encrypted payload after a scan of the glyph 2 encoding the encrypted payload.

Storing in a Key-Value Database

The method described above also comprises a step of storing 20 the at least two data subsets but the first data subset 6 into a key-value database. A key-value database is a database with a hash table data structure. In other words, the database is organised as a collection of records having different fields which themselves contain the data. The data are stored and retrieved using a storage key that identifies uniquely a record in the database. The storage key is constructed as a hash value of the payload that has been generated during the previous step of the method. In other words, it is necessary for a user to know the payload in order to retrieve the data stored in the key-value database. The data may be stored in an in-memory (RAM) database or alternatively on a solid-state drive or a hard-disk drive.

In a particular embodiment, the data may also be stored utilizing a single public cloud infrastructure and delivered at scale using a Content Delivery Network (CDN) and other authentication-less methods of content delivery at no loss of integrity, security or confidentiality due to the inability of the attacker to reversely-attribute each data set so stored to its QR code in combination with the nature of the encryption of the payload.

In a particular embodiment, the key-value database is distributed over several different cloud storage comprising for example content delivery networks (CDN), to further increase the protection of the stored data by fragmenting the data over several different storages.

In another embodiment, the access to the key-value database requires successful multi-factor authentication. For example, a user has to introduce a correct Time-based One-time Password (TOTP), HMAC-based One-time Password algorithm (HOTP), personal password or a randomly generated code sent to the user's smartphone.

Generating and Sharing Glyph

The method described above comprises a final step of generating 40 and sharing 50 a glyph 2 that provides an access to the payload. Any kind of glyph generator can be using so that the present method can be easily implemented on top of existing suitable devices.

In a particular embodiment, the glyph 2 is generated so that the encoded information is of the form https://URL/payload where URL is a uniform resource locator of an application for sharing and visualizing the data encoded in the glyph. This URL may be a locally executed web application and can be distributed via a content delivery network. It may also be an application programming interface (API) of a web service or application configured for receiving and/or processing the dataset D.

In another embodiment, the glyph 2 is generated so that the encoded information only consists of the payload. This is useful when the glyph 2 should only be used by a specialized mobile application.

The glyph 2 can then be shared via an output medium. Output media comprise for example mobile device screens, computers or physical devices on which a glyph 2 can be printed.

The present disclosure also concerns a method for interpreting a glyph 2, comprising
  via an image capture device 1.1, scanning said glyph 2 to retrieve a payload,
  deriving a first data subset 3 from said payload,
  retrieving at least one data subset 6 in a key value database using a hash of the payload as storage key,
  assembling said data subsets 3, 6 into said dataset 9,
  The first step of the method for interpreting a glyph 2 comprises the use of an image capture device 1.1 to scan a glyph. Such devices include cameras of mobile phones or tablets, or any other wireless communication device having an image capture capability.

The scan of the glyph 2 leads to a retrieving of a payload encoded in the glyph 2 and from the retrieved payload a first data subset 3 is derived. Using a hash of the payload as storage key, at least one data subset 6 is retrieved in a key-value database. Finally, the data subsets 3, 6 are reassembled into a dataset 9.

Figure 3:
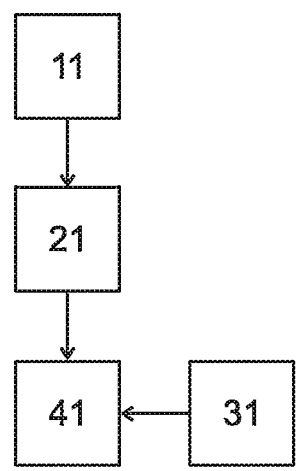
FIG. 3 illustrates a flowchart of an example of a method for interpreting a glyph according to the invention.

An embodiment of this method for interpreting a glyph 2 is illustrated by the Flowchart of FIG. 3. This embodiment comprises the following basic steps:
  11. Scanning a glyph 2 with an image capture device 1.1. to retrieve a payload.
  21. Deriving a first data subset 3 from the payload.
  31. Retrieving at least one data subset 6 in a key-value database using a hash of the payload as storage key.
  41. Assembling said data subsets 3, 6 into a dataset 9.

As the payload may have been encoded in the glyph 2 in encrypted form, an additional step of decrypting 51 the payload may be comprised in the method. This decryption step 51 can be performed by the service or application which is used to treat and process the data.

In a particular embodiment, the assembling step 41 requires using an encryption key as the data subsets may have been determined by cryptographic splitting as mentioned above. In particular, the data subsets 3, 6 may have been determined by slicing a dataset 9 into regular portions or by applying any other data splitting algorithm.

A decryption step of the reassembled dataset 8 may be needed in case of an encryption of the dataset 9. This decryption step comprises:
  deriving an encryption key from the payload,
  decrypting said dataset 8 using the encryption key.

In another embodiment, a decryption step of the reassembled dataset 8 may be needed if said dataset 9 has been encrypted with an encryption protocol needing large size encryption parameter as described above.

In this case, the decryption step comprises:
  deriving an encryption key from the payload,
  retrieving an encrypted encryption parameter in key-value database using a hash of the payload as storage key,
  decrypting said encrypted encryption parameter using said encryption key to obtain a decrypted encryption parameter,
  decrypting assembled dataset 8 using encryption parameter.

Figure 4:
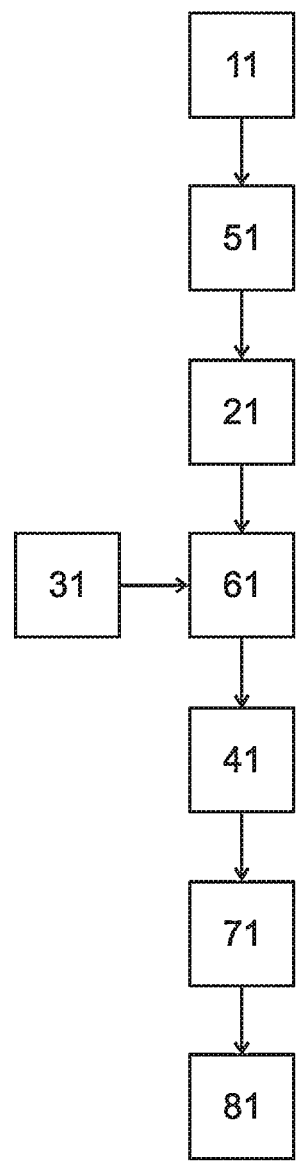
FIG. 4 illustrates a flowchart of an example of method for interpreting a glyph according to the invention.

An embodiment of a method for interpreting a glyph 2 including the previous encryption step is illustrated by the Flowchart of FIG. 4. This embodiment comprises in particular the following:
  11. Scanning a glyph 2 with an image capture device 1.1 to retrieve an encrypted payload.
  51. Decrypting the encrypted payload into a payload.
  21. Deriving a first data subset 3 and an encryption parameter.
  31. Retrieving at least one data subset 6 and an encrypted encryption parameter in a key-value database using a hash of the payload as storage key.
  61. Decrypting the encrypted encryption parameter using the encryption parameter.
  41. Assembling said data subsets 3, 6 into an encrypted dataset 8.
  71. Decrypting encrypted dataset 8 using the encryption parameter into a dataset 9.
  81. Deserialize dataset 9.

The decryption step is typically needed when the dataset 9 has been encrypted using an AES-GCM encryption protocol in which the encryption parameter comprises a large encryption key and initialization vector. In this case, the encryption parameter can be further encrypted with a symmetric encryption key of comparatively small size which is stored in the payload.

Both decryption steps mentioned above may include an additional sub step of decrypting a dataset that have been encrypted by padding.

In a particular embodiment, the step of retrieving the data subsets 6 stored in the key-value database requires a multi-factor authentication. As an additional security layer, the key-value database may also have been distributed over a plurality of clouds or content delivery networks.

In another embodiment, a deserializing 81 of the reassembled dataset 9 may be needed to recover the original data structure.

Revoking Glyphs

A mechanism for revoking a glyph 2 is also provided in the method. Indeed, it can be necessary for various reasons to be able to restrict the access to the dataset 9 from a glyph 2.

In a particular embodiment, a step of deleting the data subsets 6 stored in the key-value database is added to the method.

In another particular embodiment, a step of deleting/forgetting all the encryption parameters that have been used to encrypt the dataset 9 and/or encryption parameter and/or the payload is added to the method.

System

The present invention is further related to a system for securely sharing a dataset 9 via a glyph 2 comprising:
 a processor 1.2
 an image capture device 1.1
 a storage 7 for storing a key value database and a computer program 1.4 arranged for casing said processor 1.2 to carry out the methods described above when said program 1.4 is executed.

In a particular embodiment illustrated in FIG. 5, a system adapted for carrying out the previous methods can comprise a user equipment 1, such as a smartphone, a tablet, a computer, etc including a camera 1.1, a processor 1.2 and a memory 1.3. A glyph 2 can be scanned using the camera 1.1. A program 1.4 stored in the memory 1.3 causes the processor 1.2 to derive a payload constructed with an encrypted data subset 3 and a symmetric encryption key 4. The program 1.4 also retrieves via a suitable network 5 such as a local network, Internet, a mobile network or any other type of adapted network, at least one encrypted data subset 6 in a key-value database that is stored in a server 7. The program then proceeds to an assembling of the encrypted data subsets 8 and to a decryption of the assembled dataset to recover a decrypted dataset 9.

The user equipment 1 of FIG. 5, or another user equipment, can also be used for generating and sharing a glyph 2, using a program in memory 1.3 arranged for causing the processor 1.2 to carry out the steps of any of the above mentioned or claimed methods.

The present disclosure is also related to a data storing medium comprising a computer program 1.4 arranged for causing a data processing system to carry the methods described above when said computer program 1.4, is executed.

The data storing medium may be any memory storing a computer program arranged for causing a processor to carry out the methods for securely sharing a dataset 9 with a glyph 2 and/or interpreting a glyph 2 described above.

Additional Features and Terminology

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices (data storing mediums) and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable data storage medium, media, or physical computer storage known in the art. An example of data storing medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The invention claimed is:

1. A method for securely sharing a dataset via a glyph comprising:
   encrypting a dataset into an encrypted dataset using an encryption parameter;
   encrypting the encryption parameter using a comparatively small second encryption parameter;
   splitting said dataset into at least two data subsets using a splitting module;
   generating a payload for the glyph using a first data subset from the at least two data subsets and the second encryption parameter;
   storing all the at least two data subsets but the first data subset in a key value database with a hash value obtained from the payload as storage key;
   generating the glyph representing the payload and
   sharing the glyph via an output medium.

2. A method according to claim 1, wherein said encryption parameter comprises a symmetric encryption key.

3. A method according to claim 1, wherein said encryption parameter comprises a symmetric encryption key and an initialization vector.

4. A method according to claim 1, wherein said encryption parameter is encrypted using asymmetric cryptographic parameter utilizing a Hardware Security Module, token or web service providing this kind of function.

5. A method according to claim 4, wherein said asymmetric cryptographic parameter are encrypted using said second encryption parameter of comparatively small size.

6. A method according to claim 1, wherein said payload for the glyph is generated using said first dataset and said encryption parameter.

7. A method according to claim 5, further comprising a step of storing said encrypted encryption parameter in said key value database with a hash value obtained from the payload as storage key.

8. A method according to claim 1, wherein said splitting of the dataset is made using a cryptographic splitting module.

9. A method according to claim 1, wherein said output medium consisting of a computer or a mobile screen device.

10. A method according to claim 1, wherein said glyph consists of a barcode or matrix code.

11. A method according to claim 1, further comprising a step of revoking said glyph by deleting said data subsets from said key-value database.

12. A method according to claim 1, further comprising a step of revoking said glyph by deleting said encryption parameter and/or said second encryption parameter.

13. A system for securely sharing a dataset via a glyph comprising:
    a processor
    an image capture device
    a storage for storing a key value database and a computer program arranged for causing said processor to carry out the methods of claim 1 when said program is executed.

14. A non-transitory data storing medium comprising a computer program arranged for causing a data processing system to carry out the method of claim 1 when said computer program, is executed.

15. A method for interpreting a glyph, comprising
    via an image capture device, scanning said glyph to retrieve a payload;
    deriving a first data subset from said payload;
    retrieving at least one data subset in a key-value database using a hash of the payload as storage key;
    assembling said data subsets into said dataset; wherein said dataset is an encrypted dataset;
    deriving a second encryption parameter from said payload;
    retrieving an encrypted encryption parameter in a key-value database using a hash of the payload as storage key;
    decrypting said encrypted encryption parameter using said second encryption parameter to obtain an encryption parameter; and
    decrypting said encrypted dataset using the encryption parameter to obtain said dataset.

16. A method according to claim 15, further comprising a decryption step comprising:
    deriving an encryption parameter from said payload,
    decrypting said encrypted dataset using the encryption parameter to obtain said dataset.

17. A method according to claim 15, wherein said data subsets have been obtained from said dataset by applying a cryptographic splitting algorithm.

18. A method according to claim 15, further comprising a step of authenticating with a multi-factor authentication to access said at least one data subset in said key-value database.

* * * * *